(12) United States Patent
Uemura et al.

(10) Patent No.: US 6,182,194 B1
(45) Date of Patent: Jan. 30, 2001

(54) CACHE MEMORY SYSTEM HAVING AT LEAST ONE USER AREA AND ONE SYSTEM AREA WHEREIN THE USER AREA(S) AND THE SYSTEM AREA(S) ARE OPERATED IN TWO DIFFERENT REPLACEMENT PROCEDURES

(75) Inventors: Jose Uemura; Takashi Sakakura, both of Kamakura (JP)

(73) Assignee: Mitsubishi Denki Kabushiki Kaisha, Tokyo (JP)

( * ) Notice: Under 35 U.S.C. 154(b), the term of this patent shall be extended for 0 days.

(21) Appl. No.: 08/156,011

(22) Filed: Nov. 23, 1993

(30) Foreign Application Priority Data

Mar. 25, 1993 (JP) .................................................... 5-066554

(51) Int. Cl.<sup>7</sup> .................................................. G06F 12/08
(52) U.S. Cl. ........................................... 711/133; 711/129
(58) Field of Search ..................................... 711/113, 118, 711/123, 125, 128, 129, 130, 136, 133, 134, 145, 135

(56) References Cited

U.S. PATENT DOCUMENTS

| | | | | |
|---|---|---|---|---|
| 4,463,420 | * | 7/1984 | Fletcher | 395/460 |
| 4,464,712 | * | 8/1984 | Fletcher | 395/425 |
| 4,775,955 | * | 10/1988 | Lin | 395/472 |
| 5,125,085 | * | 6/1992 | Phillips | 395/400 |
| 5,249,286 | * | 9/1993 | Alpert et al. | 395/463 |
| 5,325,504 | * | 6/1994 | Tipley et al. | 395/425 |
| 5,327,557 | * | 7/1994 | Emmond | 395/650 |
| 5,353,425 | * | 10/1994 | Malamy et al. | 395/425 |
| 5,363,496 | * | 11/1994 | Kato et al. | 395/425 |
| 5,377,352 | * | 12/1994 | Tanaka et al. | 395/650 |
| 5,493,667 | * | 2/1996 | Huck et al. | 395/452 |
| 5,497,477 | * | 3/1996 | Trull | 395/460 |

FOREIGN PATENT DOCUMENTS

| | | |
|---|---|---|
| 60-79446 | 5/1985 | (JP) . |
| 62-145341 | 6/1987 | (JP) . |
| 4-18649 | 1/1992 | (JP) . |

OTHER PUBLICATIONS

"Cache Subsystem," Intel 80386 Hardware Reference Manual, Intel. Co., pp. 7–6 to 7–8, 1986.*
Hennessey et al., "Computer Architecture," Morgan Kaufmann Publishers, 1990, pp. 408–409.

* cited by examiner

Primary Examiner—Hiep T. Nguyen (57) ABSTRACT

A cache memory having four user memory areas in which different data in a main memory is to be respectively stored, and a system memory area in which shared data between programs in the user memory areas is to be stored. A data controller has a route register in which address information, such as information as to whether or not the data in the respective user memory area is replaceable and task information, is to be stored. The individual user memory areas are connected to one another via a cache internal address data bus and a user-area cache internal sub-address data bus. The internal bus is connected to a CPU bus and a memory bus via a memory management unit for performing address translation, etc.

26 Claims, 7 Drawing Sheets

CACHE MEMORY SYSTEM HAVING AT LEAST ONE USER AREA AND ONE SYSTEM AREA WHEREIN THE USER AREA(S) AND THE SYSTEM AREA(S) ARE OPERATED IN TWO DIFFERENT REPLACEMENT PROCEDURES

BACKGROUND OF THE INVENTION

1. Field of the Invention

This invention relates to a cache memory and more particularly to a cache memory which makes a computer system quicker by reducing cache misses.

2. Description of the Related Art

Many conventional cache memories are expensive and have hence been used in only a limited part of the computer system. But as advances have been made in process technology, application of more inexpensive memories has been on the increase recently. Meanwhile the quicker the CPU, the higher the price which had to be paid for cache mistakes; consequently using cache memories would be a key to the performance of computer systems.

The conventional technology for minimizing cache mistakes and making purge and load of data quicker is exemplified by the following prior art:

Japanese Patent Laid-Open Publication No. SHO 60-79446 discloses a concept of putting a task identifier with data to be accessed in the cache memory only when a logical address to be accessed and the task identifier coincide with each other. Japanese Patent Laid-Open Publication No. SHO 62-145341 discloses a concept of dividing the cache memory into a shared space area and a multi-space area so that purge of these divided areas can be respectively controlled. According to these prior concepts, overhead accompanying replacing of cache data is minimized in an effort to make purge and load of data quicker and more effective.

Japanese Patent Laid-Open Publication No. HEI 4-18649 discloses a concept of maintaining data of the designated cache memory area in a simple cache memory for a disc equipment having no LRU algorithm, improving the rate of processing write/read commands.

Under the foregoing circumstances, in order to realize a quick computer system, it should minimize cache mistakes or should effectively use CPU latency for the cache memory.

SUMMARY OF THE INVENTION

With the foregoing problems in mind, it is an object of this invention to provide a cache memory which minimizes cache mistakes to make a computer system quicker.

In order to accomplish the above object, according to a first aspect of the invention, there is provided a cache memory, which is adapted to be situated adjacent to a CPU, for storing part main memory data to make the CPU quicker, the cache memory comprising: one or more memory areas in which different main memory data is to be stored; and a register, situated between a cache internal address data bus and the respective memory areas, for storing access information of the data in the respective memory areas, whereby access is made to selected data only.

According to a second aspect of the invention, there is provided a cache memory, which is adapted to be situated adjacent to a CPU, for storing part of main memory data to make the CPU quicker, the cache memory comprising: one or more first memory areas in which different main memory data is stored; a register situated between a cache internal address data bus and the respective first memory areas for storing access information of the data on the respective first memory areas; and a second memory area which is connected to the cache internal address data bus and in which data shared among tasks running in the system, whereby access is made to selected data only.

According to a third aspect of the invention, there is provided a cache memory, which is adapted to be situated adjacent to a CPU, for storing part of data in a main memory to make the CPU quicker, the cache memory comprising: a register which is situated on a cache internal address data bus and in which address areas inhibiting any ejection of the data in the cache memory are stored; and a memory area in which the data in the main memory and a flag showing any inhibited ejection of the data, whereby an address area in the main memory is designated to inhibit any ejection of data.

With the first arrangement, in switching the context, if a task to be dispatched is recognized as existing in any of the memory areas by referring to a task identifier, the memory area in which the task is stored will be selected. If a task to be dispatched does not exist in any memory area, the task will be loaded in the memory area selected from the replaceable memory areas by referring to a replaceable flag. If the replaceable flag is set to be not replaceable, the data in the memory area will not be replaced.

With the second arrangement, since the second memory area in which data such as shared data, unlikely to be purged or likely to remain permanently, is connected to the cache internal address data bus independently of the first memory area in which user data is stored, it is possible to make the computer system quicker.

Thus since the data in the memory area is replaced by referring to access information, it is possible to minimize cache mistakes.

With the third arrangement, since a value indicating inhibited ejection of data may be set with the flag corresponding to the data stored in the memory area, then it is possible to inhibit ejection of data. If there is an ejection inhibit area, the start and end addresses of such a range is stored in the register. If there is no ejection inhibit area, an initial value which indicates no inhibit area has been specified is set in the register. Since a high-frequency-access program such as a system program is set to ejection inhibit so as to be permanent, it is possible to minimize cache mistakes.

DETAILED DESCRIPTION

FIRST EMBODIMENT

A first preferred embodiment of this invention will now be described with reference to the accompanying drawings.

Figure 1:
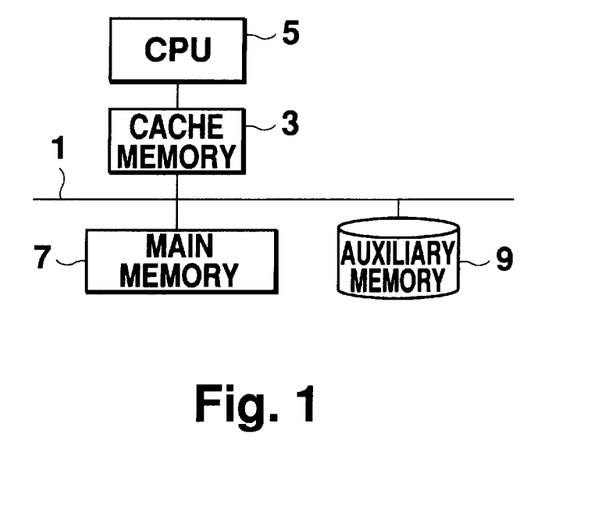
FIG. 1 is a block diagram showing a computer system having a cache memory according to this invention.

FIG. 1 is a block diagram showing the general structure of a computer system to which this embodiment is applied. A CPU 5, a main memory 7 and an auxiliary memory 9 are connected to a bus 1 via a cache memory 3 of this embodiment. In the cache memory 3, part of a program (or task) or data (hereinafter generally called "data" and occasionally called "program" or "task") in the main memory 7 is stored. In this embodiment, the cache memory 3 is used in connection with a single CPU. Alternatively it may be used in connection with a plurality of CPUs.

Figure 2:
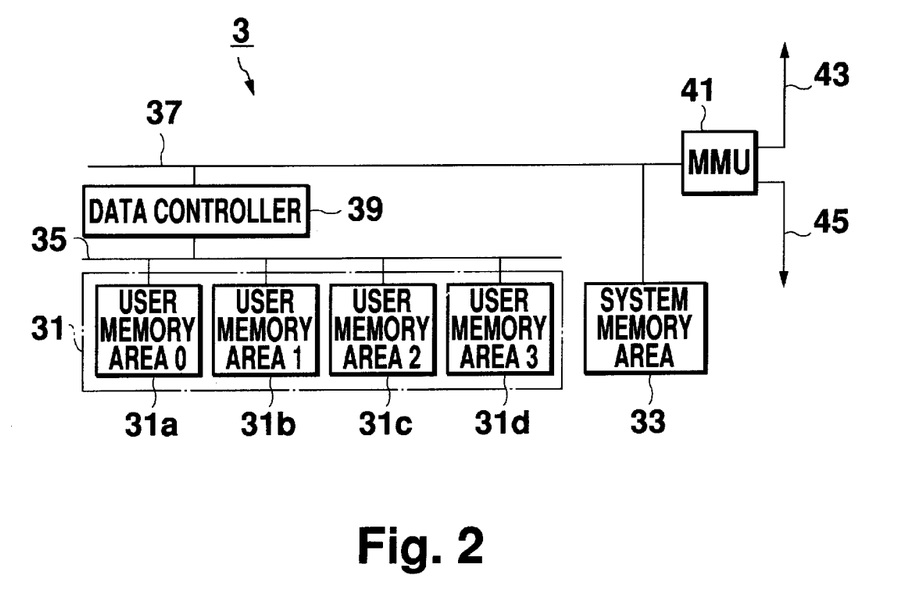
FIG. 2 is a block diagram showing a first embodiment of the cache memory of the invention.

FIG. 2 is a block diagram showing the structure of the cache memory 3. The cache memory 3 of this embodiment has four user memory areas 31a, 31b, 31c, 31d as first memory areas and a system memory area 33 as a second memory area. In each user memory area 31, all or part of different user data in the main memory 7 is stored. In the system memory area 33, system software commands and data shared between programs in the user memory area 31 are stored. Each user memory area 31 is connected to a user-area cache internal sub-address data bus 35 (hereinafter called "subbus"), while the system memory area 33 is connected to a cache internal address data bus 37 (hereinafter called "internal bus"). A data controller 39 has a route register for storing address information containing task information and information as to whether or not the data in the individual user memory area 31 is replaceable and is connected to the internal bus 37 and is also connected to the individual user memory areas 31 via the subbus 35. Thus the user memory area 31 and the system memory area 33 are connected to the internal bus 37 independently of each other. The internal bus 37 is connected to a CPU bus 43 and a memory bus 45 via a memory management unit 41 (hereinafter called "MMU") for controlling the internal bus 37.

Figure 3:
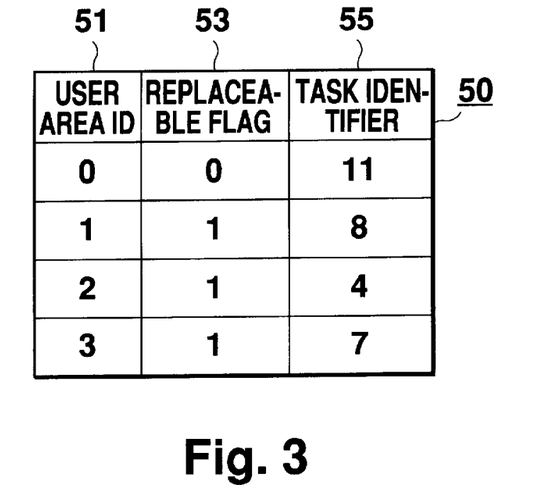
FIG. 3 is a table showing cache management in the first embodiment.

FIG. 3 shows a cache management table 50 containing the above-mentioned access information for use in cache memory management of the user memory area in switching the task context. Reference numeral 51 designates user memory area identifiers (hereinafter called "user-area ID") corresponding to the respective user memory area 31; they are 0, 1, 2 and 3 for the individual user memory areas 31a, 31b, 31c, 31d, respectively. 53 designates replaceable flags indicating whether or not other data is replaceable; in this embodiment, 1 represents "replaceable" and 2 represents "not replaceable". These replaceable flags 53 are set by system software, for example. 55 designates a task identifier for identifying a task as data occupying the individual user memory area 31. The task identifiers 55 are different numbers, one given for each task in the system. As shown in FIG. 3, the user memory area 31a whose user-area ID is 0 is not replaceable with another task, and a task whose identifier is 11 is stored in the user memory area 31a. Likewise, the user memory areas 31b, 31c, 31d whose user-area IDs are 1, 2 and 3 are each replaceable with another task, and tasks whose identifiers are 8, 4 and 7 are stored in the respective user memory areas.

As a characteristic feature of this embodiment, the system memory area 33, in which data is rarely purged because it is shared data of plural tasks or data desired to be permanent, is connected directly to the internal bus 37 independently of the user memory area 31. The system memory area 33 is not protected from particular access control such as load and purge of data.

Further, having the cache management table 50 containing access information to the respective user memory areas 31, it is possible to selectively perform access control as to whether or not the individual user memory area 31 is replaceable so that cache mistakes can be minimized.

Figure 4:
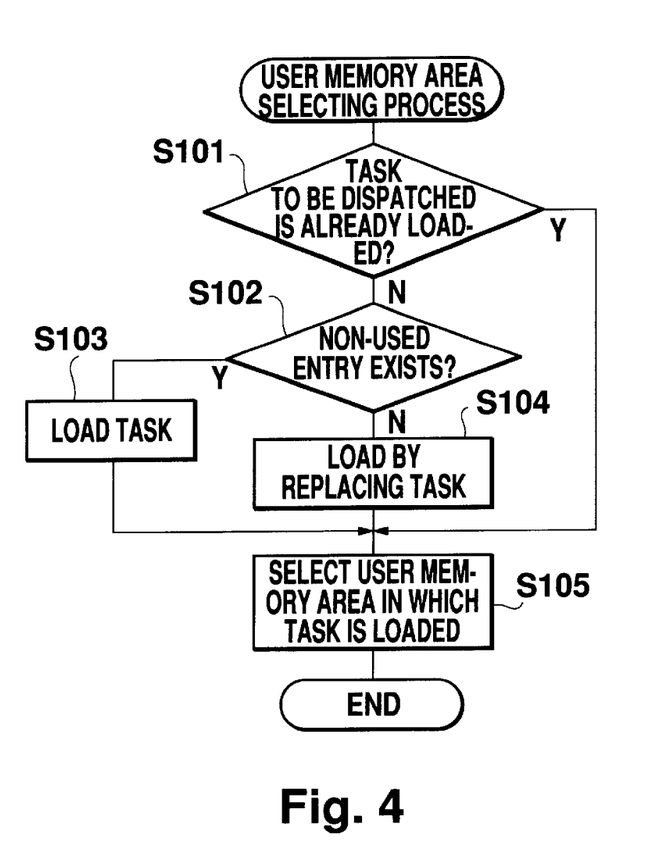
FIG. 4 is a flow diagram showing a user memory area selecting process in the first embodiment.

FIG. 4 is a flow diagram showing the manner in which cache memory control is performed in switching the context. This cache memory control will be realized at the system software level. The user memory area selecting process in this embodiment will now be described with reference to FIG. 4.

In step 101, if a task to be dispatched or completed exists in any of the user memory areas 31, a user area ID 51 of the entry corresponding to the user memory area 31 will be selected. That is, a task identifier 55 of the cache management table 50 is retrieved, and a user area ID 51 corresponding to the retrieved task identifier will be selected.

If the task does not exist in any user memory area 31, it must be loaded into any of the user memory areas 31; a user memory area 31 in which the task is to be loaded is selected in the following manner.

An entry as a value (−1) indicating that data is invalid, namely, the task identifier 55 is non-used, is retrieved (step 102). If a non-used entry exists, a task to be dispatched or transmitted to the user memory area 31 corresponding to the entry that is loaded. Of course, the value of the task identifier 55 of the entry is reloaded with the task identifier of the task. Thus, the task has been newly loaded. And the user area ID 51 of the corresponding entry will be selected (step 103). If no non-used entry exists, out of the entries whose replaceable flag 33 is replaceable (value of flag is 1), a task not in the run queue or the lowest priority task in the run queue is selected. The selected task is replaced by loading a task to be dispatched to the user memory area 31 in which this task is stored. Of course, the value of task identifier 55 of the entry is reloaded with the task identifier of the replaced task. Thus, the task has been newly loaded. The user area ID 51 of the corresponding entry will be selected (step 104).

Thus, the user area ID 51 in which the task to be dispatched is loaded will be selected (step 105), and therefore the task in the selected user memory area 31 will be processed by the CPU 5.

In this embodiment, as described above, since replaceable flags 53 are put one with each entry of the cache management table 50, i.e., each user memory area 31, the task such as for a real time application which it is desirable to keep in the user memory area 31 all times can be made not replaceable. Since whether or not data is replaceable and invalidation of data can be set as required for every user memory area 31, it is possible to minimize cache mistakes, giving no influence on the other user memory areas 31 due to that action. Since the system memory area 33 is connected directly to the internal bus 37 independently of the user memory area 31, it will not be an object to be processed, thus making the computer system quicker.

These four user memory areas 31 may be located either in respective small memories or in a common large memory. Also in the system memory area 33, system software and shared data may be separated from each other, and may be divided into a plurality of areas, like the user memories 31.

SECOND EMBODIMENT

A second preferred embodiment of this invention will now be described with reference to the accompanying drawings.

FIG. 1 is a block diagram showing the general structure of a computer system to which this embodiment is applied. As this computer system is similar in structure to that of the first embodiment, its description is omitted here for clarity.

Figure 5:
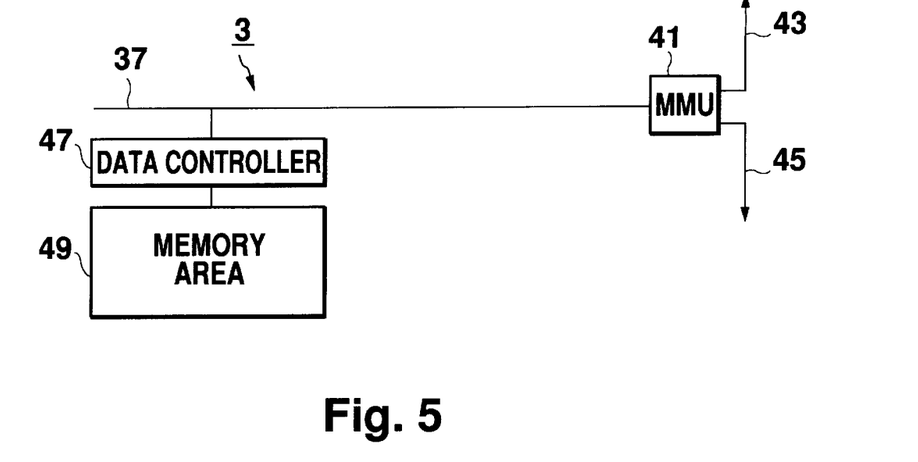
FIG. 5 is a block diagram showing a second embodiment of the cache memory.

FIG. 5 is a block diagram showing the structure of a cache memory 3. The parts or elements substantially similar to that of the first embodiment are designated by like reference numerals, and their description is omitted. A memory area 49 in which data in a main memory 7 is stored is connected to a cache internal address data bus 37 (hereinafter called "internal bus") via a data controller 47 equipped with an ejection inhibit area register in which the start and end addresses of an address area inhibiting ejection of data in the main memory 7 are stored. An memory management unit (hereinafter called "MMU") 41 of this embodiment issues a physical address to the internal bus 37 by its address translator.

Figure 6:
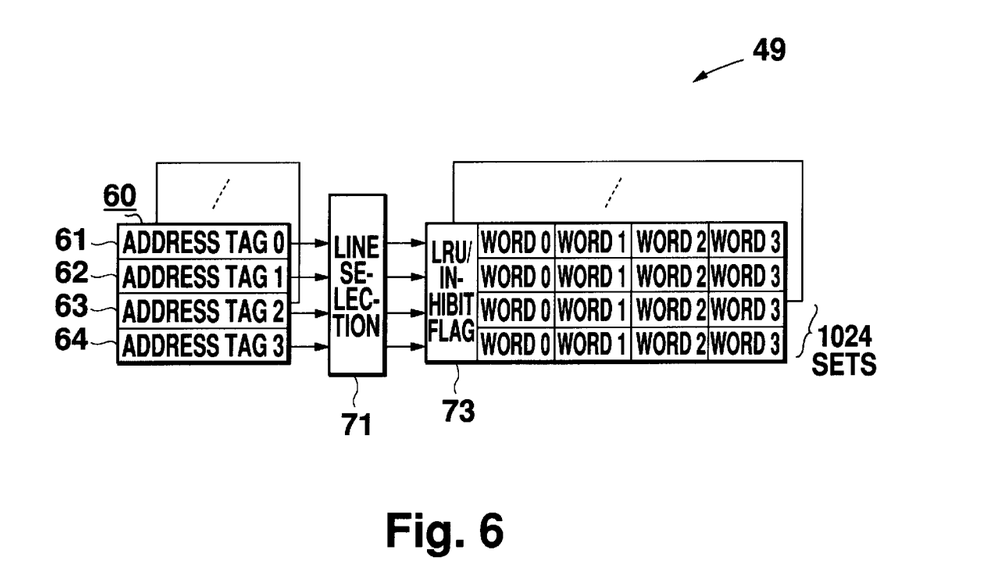
FIG. 6 is a diagram showing the structure of the memory area of the second embodiment.

FIG. 6 shows the structure of a memory area 49. In this embodiment, set associative is used; the number of sets of four way lines 60 is 1024, i.e. four words for each line. 61, 62, 63 and 64 designate respective set of lines (also called "address tags"); 71, a line selection logic; 73, an LRU/inhibit flag in which an LRU (Least Recent Used) algorithm and flags for realizing inhibition of ejection of data are stored, four words in every line.

Figure 7:
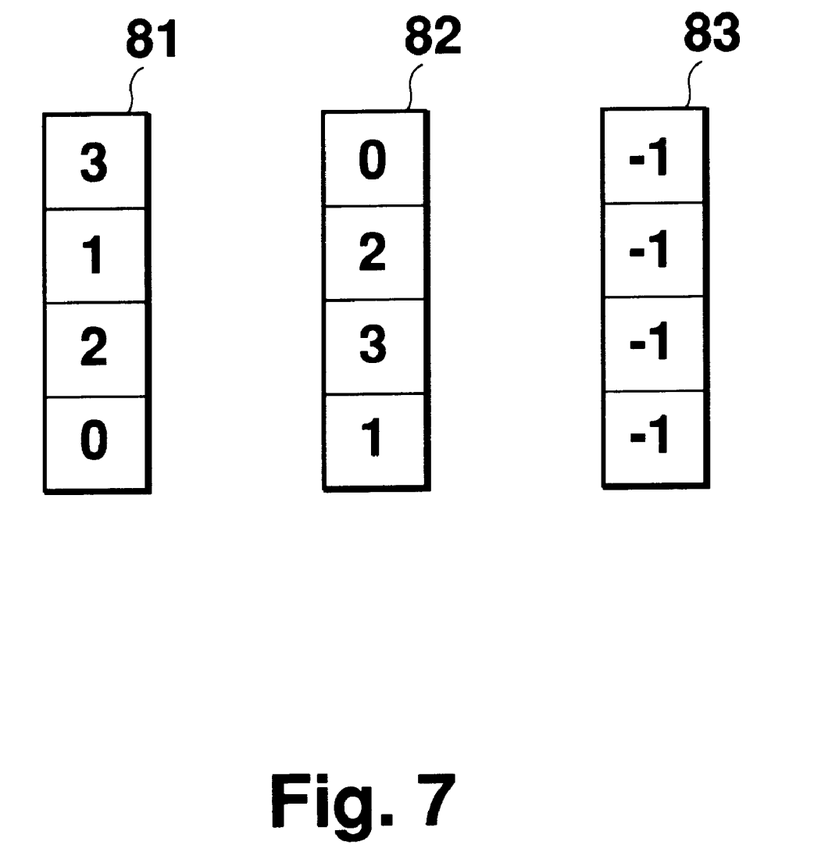
FIG. 7 is a diagram showing the state of an LRU value in the second embodiment.

FIG. 7 shows examples of the state of LRU values 81, 82, 83 in LRU/inhibit flag 73. The LRU values are updated to output of four way lines 60. The LRU value updating process and the ejection inhibit process of cache data will now be described with reference to the LRU value updating process.

0, 1, 2 and 3 as the LRU values of FIG. 7 represent the precedence of LRU, 3 being the highest. Ejection of cache data is executed in the order of largeness of LRU values when it is needed. As cache data is updated, the LRU value will be updated to 0 while the LRU values of the remaining lines will be increased in increments of one. In FIG. 7, the data corresponding to the LRU value 3 highest on the state of LRU values 81 will be ejected, and each LRU value will be updated to the state of LRU values 82. At every initialization time, the LRU value "3" is stored. If it shows the same LRU values, any line is selected based on predetermined conditions that a task on run queue or the task of the lowest priority in the run queue is to be selected. a inhibit flag (−1) is set in the line corresponding to the ejection inhibit area. State of LRU value 83 shows that every line is in inhibit state. When every line is in inhibit release state in which ejection is to be inhibited like states of LRU values 81, 82, −1 is set in the front address of the ejection inhibit area register of the data controller 47.

Figure 8:
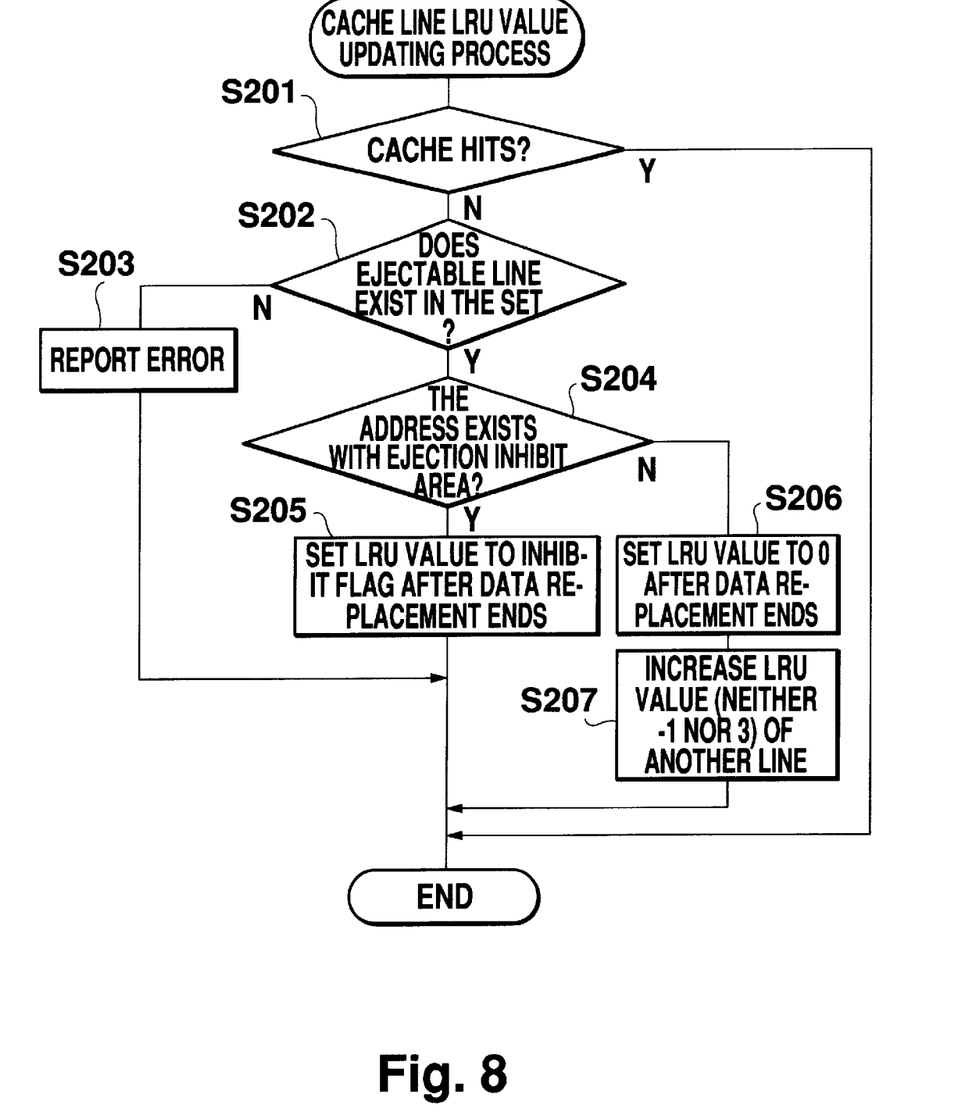
FIG. 8 is a flow diagram showing an LRU value updating process of cache line in the second embodiment.

FIG. 8 is a flow diagram showing the LRU value updating process of the cache line. By designating the ejection inhibit area through a command interface of the cache memory 3 of this embodiment, the ejection inhibit area is set. The LRU value updating process of the cache line will now be described with reference to FIG. 8.

In step 201, if the data to be processed by the CPU 5 already exists in a set corresponding to the address of the data (cache hit), the updating process ends as the data may be used.

In step 202, checking is made as to whether every line is in a state of inhibiting ejection of cache data like the state of LRU value 83 of LRU values in the set corresponding to the address. If every line is in an ejection inhibit state, there is no LRU value to be updated, and then an error is reported (step 203) and the LRU value updating process ends. Hereafter, when access is made to the address, it will always be accessed to the main memory 7, which circumstance should be avoided by system software.

In step 204, if usable lines exist, a line with a high LRU value is selected as mentioned above, and replacement is made with the data of the address in a predetermined memory area corresponding to the line. If the address is an address in the area already set in the ejection inhibit area register, the LRU value of the line is set to an inhibit flag (−1) (step 205). If the address does not exist in the ejection inhibit area, the LRU value of the selected line is set to 0 (step 206) after termination of cache data. If the LRU value of the other lines are neither −1 nor 3, they are increased by an increment of one (step 207).

Figure 9:
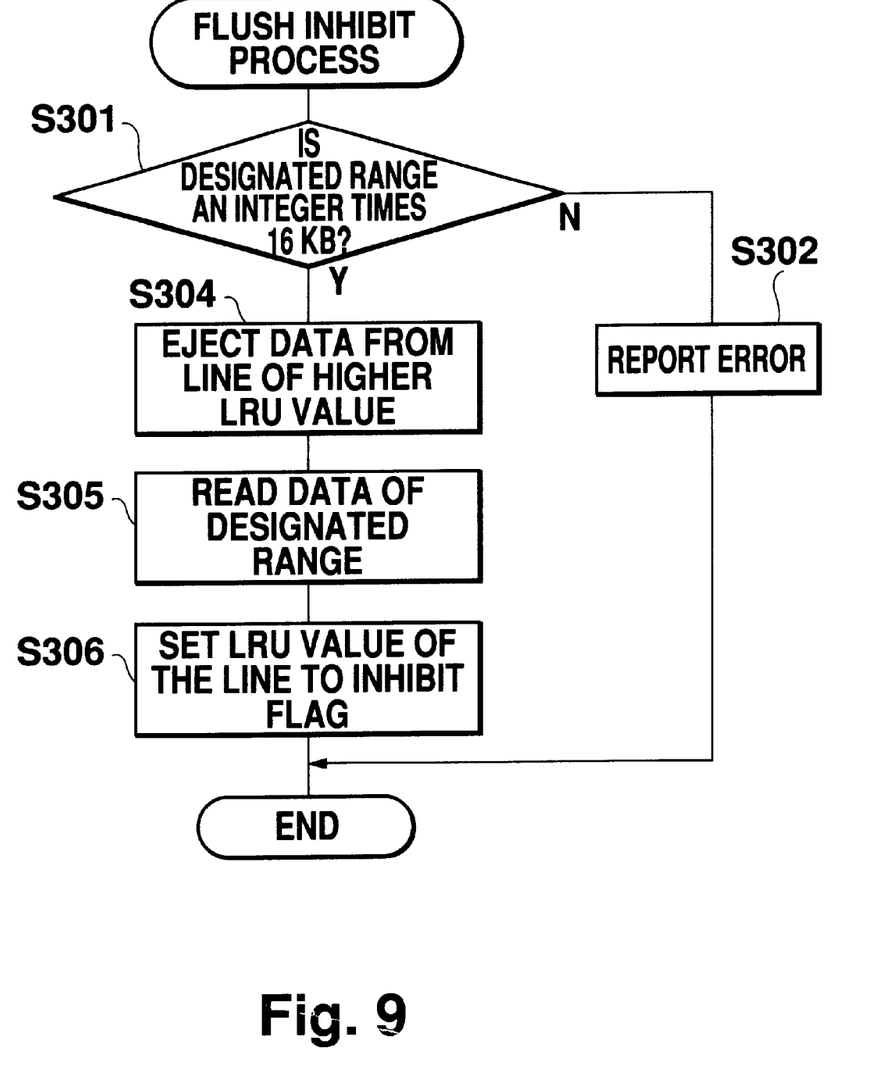
FIG. 9 is a flow diagram showing a flush inhibiting process in the second embodiment.
Figure 10:
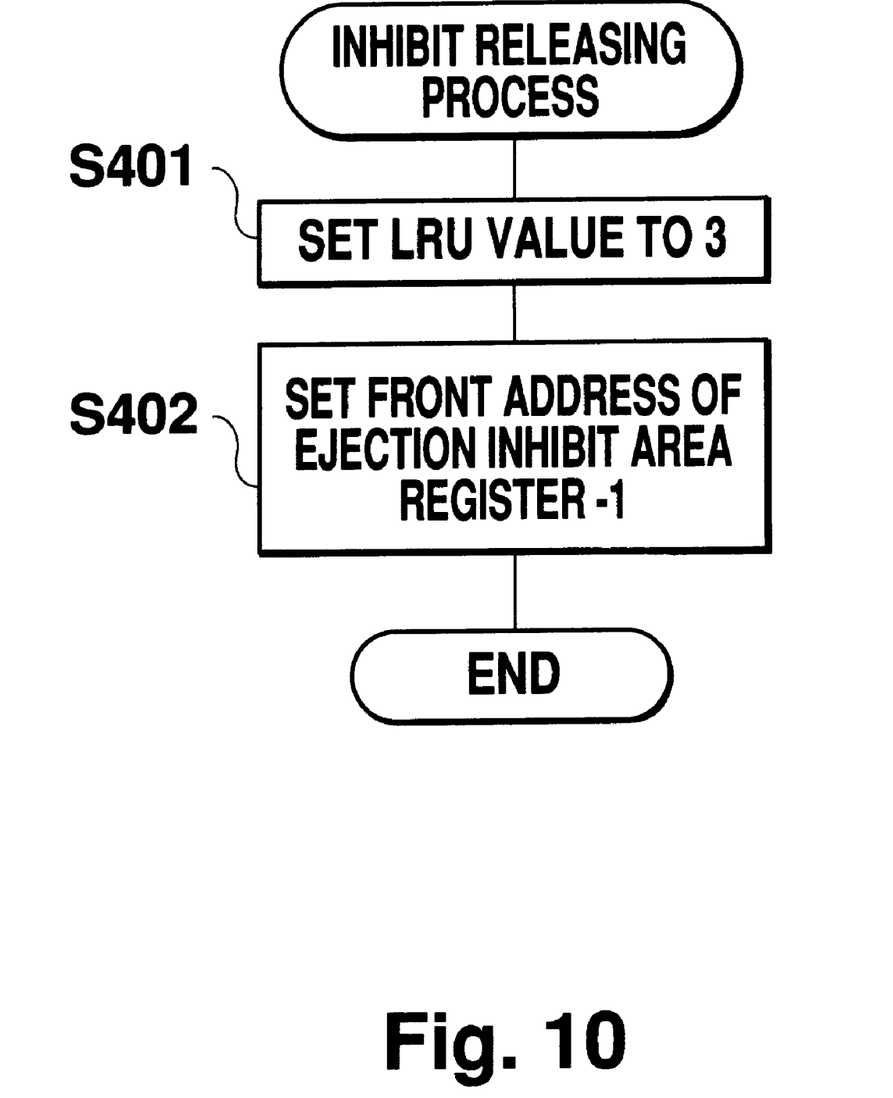
FIG. 10 is a flow diagram showing a inhibit releasing process in the second embodiment.

The cache memory 3 of this embodiment also has a function of designating the data consecutive areas of at maximum 64 KB in four way lines 60, i.e., in terms of 16 KB, which is a memory capacity of 1024 sets of four way lines, through a command interface and replacing the LRU value for every data designated area when issuing a command so that ejection of data can be inhibited. FIG. 9 is a flow diagram showing the flush inhibiting process in which ejection of data is inhibited. The flush inhibit process will now be described with reference to FIG. 9.

Checking is made as to whether the designated range of data addresses to be processed by the CPU 5 is any integer of 1 to 4 times 16 KB (step 301). If it is not, an error is reported (step 302) and the flush inhibit process is ended.

Subsequently, data of necessary lines is ejected from every set in the order of largeness of the LRU value and maintained (step 304), and the data of the designated range of the ejection inhibit area is read (step 305). The LRU value of the LRU/inhibit flag 73 in which the data is replaced is set to −1 (step 306).

According to this embodiment, it is possible to inhibit the data in the physical address on the designated main memory 7 from being ejected. Thereby, by setting, for example, a system program and a real time program, which are to be repeatedly used, in the ejection inhibit area, it is possible to minimize cache mistakes.

As mentioned above, with the cache memory of the first embodiment, one or more first memory areas are connected to the cache internal address data bus independently of the second memory area.

Having a register containing access information, it is possible to perform selective access control as to whether or not each memory area is replaceable with other data, thus minimizing cache mistakes.

According to the cache memory of the second embodiment, by storing a program, which is to stay at all times in the main memory, such as the kernel code of an operating system, in the address area in which ejection of data on the cache memory is inhibited, it is possible to minimize cache mistakes. Plural address areas inhibiting ejection of data may be consecutive.

Further, data stored in the above-mentioned ejection inhibit area is processed in a closed environment between the CPU and the cache memory. As long as ejection inhibit is not released, it is not necessary to store the data, which has been stored in the cache memory via the main memory, in the main memory, so it would be possible that user can use the cache memory as part of the main memory without mapping the main memory as a sub-storage by loading and accessing the data by the CPU.

What is claimed is:

1. A cache memory, for connection to a central processing unit (CPU), for storing a portion of data in a main memory, said cache memory comprising:
   a cache internal-address data bus;
   at least one user memory area for storing the portion of data in the main memory;
   a system memory area for storing system software commands and shared data shared between programs, the system memory area being separate from the at least one user memory area and coupled to the cache internal-address data bus, wherein the replacement of the data in the user memory area and the system memory area operate independently under different procedures;
   a data controller coupled between the cache internal-address data bus and the at least one user memory area, the data controller including a register capable of communicating with the at least one user memory area for storing access information for each user memory area, said access information including:
      a task identifier for identifying the task data in the respective user memory area; and
      a user area identifier for identifying the user memory area associated with the task identifier;
      a replaceable flag showing whether the data in the respective user memory area is replaceable;
      the replaceable flag having a first value when the data in the respective memory area is replaceable and a second value when the data in the respective memory area is not replaceable.

2. A cache memory according to claim 1, wherein said internal-address data bus is coupled to the main memory and the CPU via a memory management unit for controlling the internal-address data bus, wherein the memory management unit includes an address translator.

3. A cache memory according to claim 1, further comprising a cache management table having the task identifier and the replaceable flag for each user memory area, wherein when a task to be loaded has a task identifier corresponding to a non-used user memory area exists in the cache management table the task to be loaded is loaded in the non-used user memory area.

4. A cache memory according to claim 1, wherein when the task identifier corresponding to a non-used user memory area does not exist and a corresponding replaceable flag indicates a replaceable user memory area, a task is replaced in the replaceable user memory area.

5. A cache memory according to claim 1, wherein when a replaceable flag indicates that data is not replaceable, a task loaded already is not replaced in the respective user memory area.

6. The cache memory of claim 1, wherein:
   each of the at least one memory area includes a plurality of memory locations; and
   the task identifier indicates whether a task corresponding to the task identifier is already loaded in the cache memory.

7. The cache memory of claim 1, wherein the data in the respective user memory area identified by the task identifier are program instructions executed by the CPU to perform a task associated with the task identifier.

8. A cache memory, for connection to a central processing unit (CPU), for storing a portion of data in a main memory, said cache memory comprising:
   a cache internal-address data bus;
   at least one first memory area for storing the portion of data in the main memory;
   a data controller coupled between the cache internal-address data bus and the at least one first memory area, the data controller including a register capable of communicating with the at least one first memory area for storing access information for each memory area indicative of whether data in a respective first memory area is replaceable by the CPU; and
   a second memory area connected to the cache internal address data bus for storing data shared between a plurality of tasks of the CPU, the second memory area being segregated from the at least one first memory area to facilitate independent data updating procedures for the first memory area and the second memory area, wherein the access information for each first memory area includes:
      a task identifier for identifying the data in the respective first memory area;
      a first user area identifier for identifying the user memory area associated with the first task identifier; and
      a replaceable flag showing whether the data in the respective first memory area is replaceable, the replaceable flag having a first value when the data in the respective memory area is replaceable and a second value when the data in the first respective memory area is not replaceable.

9. A cache memory according to claim 8, wherein said internal-address data bus coupled to the main memory and the CPU via a memory management unit for controlling the internal-address data bus, wherein the memory management unit includes an address translator.

10. A cache memory according to claim 7, wherein when the task identifier corresponds to a non-used user memory area of the first memory area a task is loaded in the non-used user memory area.

11. A cache memory according to claim 7, wherein when the task identifier does not correspond to a non-used user memory area of the first memory area and a corresponding replaceable flag indicates a replaceable first memory area, a task is replaced in the replaceable first memory area.

12. A cache memory according to claim 7, wherein when a replaceable flag indicates that data is not replaceable, a task loaded already is not replaced in a user memory area of the respective first memory area.

13. The cache memory of claim 8, wherein:
   each of the at least one memory area includes a plurality of memory locations; and
   the task identifier indicates whether a task corresponding to the task identifier is already loaded in the cache memory.

14. The cache memory of claim 8, wherein the data in the respective user memory area identified by the task identifier are program instructions executed by the CPU to perform a task associated with the task identifier.

15. A method for controlling data associated with a task in a cache memory, comprising the steps of:
   determining replaceable data in a user memory area by reading a replaceable flag, the replaceable flag having a first value when data in a corresponding memory area is replaceable and a second value when the data in the corresponding memory area is not replaceable;
   when there is not unused cache memory space of the user memory area, loading the data associated with the task in a cache memory space occupied by the replaceable data; and storing system software commands and shared data between or among tasks with related task identifiers in a system memory area segregated from the user memory area such that replacement of the data in the user memory area and the system memory area operate independently under different procedures, wherein said cache memory has a plurality of user memory areas, each of the user memory areas being provided with a user area identifier, a task identifier, and a replaceable flag.

16. The method of claim 15, wherein the step of loading the data associated with the task in a cache memory space occupied by replaceable data includes loading the data in a cache memory space of the user memory area corresponding to a task having a lowest priority.

17. The method of claim 15, wherein the step of loading the data associated with the task in a cache memory space occupied by replaceable data includes loading the data in a cache memory space of the user memory area corresponding to a task that is not in a run queue.

18. The method of claim 15, further including the step of storing data associated with multiple tasks in a single space of the system area memory.

19. The method of claim 15, wherein
the method further comprises a step of providing a cached task identifier for each task of the plurality of tasks to indicate whether particular data is currently stored in the cache memory.

20. The method of claim 11, further comprising the steps of determining whether data associated with the task is already loaded in the cache memory includes determining whether program instructions of the task to be executed by a CPU are already loaded in the cache memory.

21. A method for controlling data stored in a cache memory so that a CPU may execute multiple tasks, the cache memory including a plurality of memory areas, each of the plurality of memory areas including a plurality of memory locations, the method comprising the steps of:

executing a plurality of tasks;

assigning each task of the plurality of tasks to a respective one of the plurality of memory areas;

storing data associated with each task in the plurality of memory locations of the respective memory area;

storing a plurality of task identifiers associated with the plurality of memory areas, each of the task identifiers identifying a respective one of the plurality of tasks; and storing a plurality of replaceable flags, each of the plurality of replaceable flags identifying whether a respective one of the plurality of tasks is replaceable by another task, each replaceable flag having a first value when the respective one of the plurality of tasks is replaceable and a second value when the respective one of the plurality of respective tasks is not replaceable, and wherein the replaceable flag and task identifier of each cache memory area are stored in a register within said cache memory.

22. The method of claim 21, further comprising the steps of:

determining a new task to be executed by the CPU;

querying each of the plurality of task identifiers to determine whether the new task is already loaded as one of the plurality of tasks;

when the new task is not already loaded, determining whether any of the plurality of replaceable flags identify that a respective task is replaceable; and when the new task is not already loaded and when one of the plurality of replaceable flags identifies that a respective task is replaceable, loading the new task by replacing the respective task with the new task.

23. The method of claim 22, further comprising the steps of:

assigning a respective priority to each of the plurality of tasks; and when a new task is not already loaded and none of the plurality of replaceable flags identifies that a respective task is replaceable, loading the new task by replacing a task having a lowest respective priority with the new task.

24. The method of claim 22, further comprising the step of executing the new task from the respective memory area when the new task is already loaded as one of the plurality of tasks.

25. The method of claim 22, further comprising the step of executing the new task from the respective memory area after the new task is loaded into the respective memory area.

26. The method of claim 21, wherein the step of storing data associated with each task in the respective memory area includes storing instructions of each task in the respective memory area, a CPU executing each task from the instructions stored in the respective memory area.

* * * * *